United States Patent [19]
Lanzy et al.

[11] Patent Number: 6,092,198
[45] Date of Patent: Jul. 18, 2000

[54] SYSTEM AND METHOD FOR ENABLING AND CONTROLLING ANONYMOUS FILE TRANSFER PROTOCOL COMMUNICATIONS

[75] Inventors: Garrett Roman Lanzy, Endicott; Francis Alan Pflug, Newark Valley; Gary Herbert Stange, Apalachin, all of N.Y.

[73] Assignee: International Business Machines Corporation, Armonk, N.Y.

[21] Appl. No.: 08/806,896

[22] Filed: Feb. 25, 1997

Related U.S. Application Data

[60] Provisional application No. 60/018,545, May 29, 1996.

[51] Int. Cl.[7] .................................................. G06F 13/00
[52] U.S. Cl. .......................... 713/201; 713/202; 713/200
[58] Field of Search .............................. 395/186, 187.01, 395/188.01

[56] References Cited

U.S. PATENT DOCUMENTS

| | | | |
|---|---|---|---|
| 5,241,594 | 8/1993 | Kung | 380/4 |
| 5,548,724 | 8/1996 | Akizawa et al. | 395/200.03 |
| 5,604,803 | 2/1997 | Aziz | 380/25 |
| 5,689,708 | 11/1997 | Regnier et al. | 395/682 |
| 5,793,966 | 8/1998 | Amstein et al. | 395/200.33 |

OTHER PUBLICATIONS

Postel, J. B., and Reynolds, J. K. *"File Transfer Protocol (FTP)"*, Network Working Group, RFC959, Oct., 1985, pp. 1–69.

Braden, R. (editor). *"Requirements for Internet Hosts—Application and Support"*, Internet Engineering Task Force, Network Working Group, RFC1123, Oct., 1989, pp. 1–98.

Deutsch, P., Emtage, A., and Marine, A. *"How to Use Anonymous FTP"*, Network Working Group, RFC1635, May, 1994, pp. 1–13.

*Primary Examiner*—Ayaz R. Sheikh
*Assistant Examiner*—Raymond N Phan
*Attorney, Agent, or Firm*—Shelley M Beckstrand

[57] ABSTRACT

Control of anonymous file transfer protocol server using exit programs: FTP and anonymous FTP communications are enabled and controlled by operating a server logon exit program to deny or authorize a logon request based on any combination of a user authentication string and/or client network address; and operating a request validation exit program to deny or authorize an action request based on any combination of type of request, user, client network address, and specific data requested.

7 Claims, 1 Drawing Sheet

SYSTEM AND METHOD FOR ENABLING AND CONTROLLING ANONYMOUS FILE TRANSFER PROTOCOL COMMUNICATIONS

CROSS-REFERENCES TO RELATED APPLICATIONS

This application claims priority under 35 U.S.C. 120 of U.S. patent provisional application Ser. No. 60/018,545 filed May 29, 1996, entitled "Control of Anonymous File Transfer Protocol Server."

BACKGROUND OF THE INVENTION

1. Technical Field of the Invention

This invention pertains to communication between computer systems, and more particularly to the control of anonymous file transfer protocol server using exit programs.

2. Background Art

File Transfer Protocol (FTP) is the standard application for transfer of files between computers attached to Transmission Control Protocol/Internet Protocol (TCP/IP) networks, including the Internet. FTP is a "client/server" application, such that a user runs a program on one computer system, the "client", which communicates with a program running on another computer system, the "server". The interface between the FTP client and server programs is officially defined by two Request For Comment (RFC) memoranda approved by the Internet Architecture Board of the Internet Society:

Postel, J.B., and Reynolds, J.K. "File Transfer Protocol (FTP)", RFC959, October, 1985.

Braden, R. (editor). "Requirements for Internet Hosts—Application and Support", RFC1123, October, 1989.

Normal operation of FTP requires the user to enter a user identifier and password for authentication on the server system. However, some system owners have the need to make some data files available as "public" data. To facilitate the transfer of such files, an informal protocol known as "anonymous FTP" has been developed which allows a user to obtain data from an FTP server without requiring normal user identifier and password authentication. There is no formal specification of anonymous FTP, but the following informational RFC describes its use:

Deutsch, P., Emtage, A., and Marine, A. "How to Use Anonymous FTP", RFC1635, May, 1994.

Anonymous FTP presents several problems to any owner of a server system which allows it:

1. How is access to the "public" data controlled?
2. How is data which are not considered to be "public" protected?
3. How can the system owner obtain statistics about access to public data?

It is an object of this invention to provide a system and method for overcoming these problems in the prior art by enabling selective denial or approval of anonymous logon requests based on any combination of a user authentication string and/or client network address; and selective denial or approval of anonymous action requests based on any combination of type of request, user, and/or client network address, and or the specific data requested.

SUMMARY OF THE INVENTION

In accordance with the system and method of this invention, FTP and anonymous FTP communications are enabled and controlled by operating a server logon exit program to deny or authorize a logon request based on any combination of a user authentication string and/or client network address; and operating a request validation exit program to deny or authorize an action request based on any combination of type of request, user, client network address, and/or the specific data requested.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
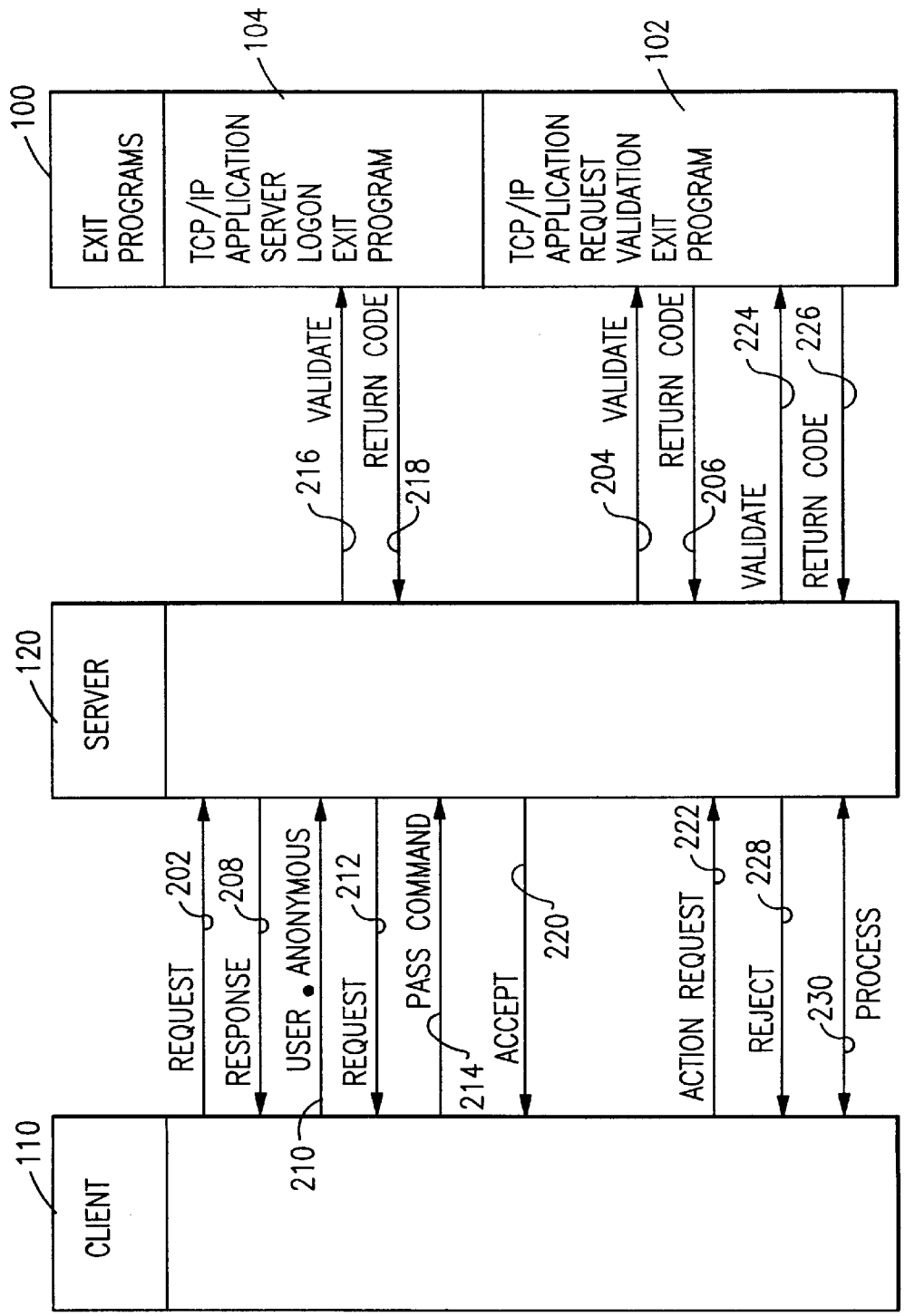
FIG. 1 illustrates the method and system of the invention for enabling and controlling FTP and anonymous FTP communication.

Referring to FIG. 1, in accordance with this invention, exit programs 100 are provided that allow a customer to implement anonymous FTP for clients 110 to access, for example, files on server 120. This invention provides two exit program interfaces (code) that work together: TCP/IP application request validation exit program 102, and TCP/IP application server logon exit program 104.

Prior implementations of anonymous FTP maintain a directory named, on UNIX servers for example, ~ftp/pub (which is, generally, a file of pointers to other files), and the fact that that named directory exists enables anonymous FTP. (UNIX is a trademark of UNIX System Laboratories, licensed exclusively by X/Open Company, Ltd.)

In accordance with this invention, the user writes and installs exit programs 100 which control whether or not and how anonymous FTP is enabled and works. This permits the application to then enable or deny access to specific data on the server 120, and to grant and revoke authority to a client 110 based upon the source of the request. It also allows a server 120 to enable access under anonymous FTP to clients 110 that are connected to specific systems or networks.

According to the method of the invention, FTP and anonymous FTP processing on a digital computer is enabled and controlled by building a server 120, including:
  defining a server logon exit program interface
    including user identifier, authentication string, client IP address and return code parameters;
  defining a request validation exit program interface
    including an operation identifier, user name, client IP address, operation specific information, and return code parameters;
  providing in a server program a data transformation routine, and routines for controlling server commands such as commands for session initialization, directory creation, directory deletion, set current directory, list files, delete file, send file, receive file, rename file and execute operating system command;
building and installing a logon exit program 104 and a request validation exit program 102 for enforcing the security policies of a user enterprise with respect to the FTP server 120;
operating the server 120 to establish a client session, including:
  receiving a request 202 for connection from a client;
  calling 204 said request validation exit to validate the request;

receiving 206 a return code from said request validation exit program authorizing or rejecting the connection request;

responsive to the return code, if not authorized, rejecting the connection; otherwise:

activating 208 the connection to the client 110;

receiving 210 a user subcommand containing the user name;

responsive to a user name of anonymous, requesting 212 an electronic mail address from said user; and thereafter receiving 214 a PASS subcommand from said user containing the e-mail address as an authentication string;

responsive to a user name other than anonymous, requesting a password from said user, and thereafter receiving a PASS subcommand from said user containing the password as an authentication string;

calling 216 the server logon exit program, including user name and authentication string and the client network (for example, IP address);

receiving 218 a return code from said server logon exit program;

responsive to a reject return code, rejecting the logon request;

responsive to an unconditional accept return code, accepting 220 the logon request without further authentication; and responsive to a conditional accept return code, validating the authentication string as a logon password;

operating said server to process requests from the client session, including receiving 222 an action request to perform an action on the server system;

calling 224 said request validation exit to validate the action request;

receiving 226 a return code from said request validation exit program authorizing or rejecting the action request;

responsive to the return code, if not authorized, rejecting 228 the action request; otherwise processing 230 said action request;

whereby said server logon exit program can deny or authorize said logon request based on any combination of user authentication string and/or client network address; and said request validation exit program can deny or authorize said action request based on any combination of type of request, user, client network address, and/or the specific data requested.

In accordance with a more specific embodiment of the invention, in order to solve the problems previously outlined for anonymous FTP, the IBM AS/400 FTP server is enhanced to provide the capability of calling two different exit programs.

An "exit program" is a computer program which is called by an existing computer application, using a defined interface, which is not part of the application, but makes decisions or takes actions on behalf of the application. These exit programs then control access to both the FTP server itself and data residing on the FTP server system.

The first exit program, "TCP/IP Server Logon Exit Program", controls the process of authenticating a user to the FTP server. After obtaining the user identifier and authentication string from the FTP client, the server calls the logon exit program, providing this information and the network address of the FTP client. Based on this information, the exit program then determines whether or not the session should be allowed, and returns information to the FTP server for completion of the authentication process. The information returned by the logon exit program includes a return code indicating whether or not the session should be allowed and the authentication to be used for the session. For an anonymous FTP session, the logon exit program provides a return code indicating that the session should be allowed without requiring a password for authentication, and optionally, a default library (file directory) for the session.

The second exit program, "TCP/IP Request Validation Exit Program", controls execution of operations requested during an FTP session. For each relevant operation, the FTP server calls the request validation exit program, providing the type of operation and related information (such as the full name of the file for a file transfer request). Based on this information, the exit program decides if the request should be allowed and provides a return code to indicate this decision to the FTP server. The following types of operations are controlled by the request validation exit point:

1. session initialization
2. directory/library creation
3. directory/library deletion
4. set current directory
5. list files
6. file deletion
7. sending file
8. receiving file
9. renaming file
10. server command execution To allow anonymous FTP, the customer writes and installs these exit programs to implement the desired security rules. The exit programs can also perform any logging or statistics gathering functions desired by the customer. Without the exit programs installed, anonymous FTP is not allowed. The exit program approach allows the customer complete control over access to data residing on the FTP server. This solution provides far more granular control than heretofore provided over data which can be accessed anonymously. For example, many system owners may want to have data files available to all regular users of their system, but still restrict access by anonymous users. This solution provides the controls necessary to do so without requiring a major change in the system's security setup.

Below are definitions of the exit program interfaces. These definitions include reference to an FTP client exit program which is not part of the invention described herein, but are shown for completeness. It is an advantage of the invention that no changes are required to the FTP client exit program, nor to the FTP client value of the application identifier parameter. These are shown for completeness.

Referring to Table 1, three new exit points are provided for FTP. Two of the exit points use the same exit point format, VLRQ0100, with separate exit points for the FTP client and the FTP server.

The exit point formats have been generalized so that they may be used for other TCP/IP applications in the future.

The TCP/IP request validation exit program provides additional control over whether or not an operation will be allowed to occur. The decisions made by the exit program are in addition to any validation performed by the application program if the exit program is not installed. When installed, the exit program is called for each of the request types listed under Operation identifier in Required Parameter Group.

Two different exit points are provided. Exit point QIBM_QTMF_CLIENT_REQ is used to validate requests processed by the FTP client program. Exit point QIBM_QTMF_SERVER_REQ is used to validate requests processed by the FTP server program. If desired, the same exit program may be used to validate requests from both of these exit points. When the user exit program is given control, it verifies that the operation specified by the input parameters should be allowed to be performed. The setting of the output parameter determines whether or not the application will continue to perform this operation.

All character data passed to the exit program is in the coded character set identifier (CCSID) of the job, or if the job CCSID is 65535, the default CCSID of the job.

Required Parameter Group
Application identifier
   INPUT;
   BINARY(4)
   Identifies the application program from which the request is being made. The possible values are:

| | |
|---|---|
| 0 | FTP client program |
| 1 | FTP server program |

Operation Identifier
   INPUT; BINARY(4)
   Indicates the operation which the user is attempting to perform. When the application identifier indicates the FTP client or FTP server program, the possible values are:

| | |
|---|---|
| 0 | Session initialization |
| 1 | Directory/library creation (This value is used for the FTP server CRTL command.) |
| 2 | Directory/library deletion |
| 3 | Set current directory |
| 4 | List files |
| 5 | File deletion |
| 6 | Sending file |
| 7 | Receiving file |
| 8 | Renaming file |
| 9 | Execute CL command |

User Profile
   INPUT; CHAR(10)
   The user profile under which the requested operation will be run (if it is allowed).
   Remote IP Address
   INPUT; CHAR(*)
   The Internet Protocol (IP) address of the remote host system.
   This string is in dotted decimal format, left justified.
Length of Remote IP Address
   INPUT; BINARY(4)
   Indicates the length (in bytes) of the remote IP address.
Operation Specific Information
   INPUT; CHAR(*)
   Information which describes the operation being attempted. The contents of this field are dependent on the value of the operation identifier.

For operation identifier 0 and application identifier 0, there is no operation specific information; this field is blank.

For operation identifier 0 and application identifier 1, the operation specific information contains the IP address of the connection on the local host system, which identifies the TCP/IP interface through which the connection is established. This string is in dotted decimal format, left justified.

For operation identifiers 1 through 3, the operation specific information contains the name of the directory or library on which the operation is to be performed. The directory or library name is formatted as an absolute path name.

For operation identifiers 4 through 8, the operation specific information contains the name of the file on which the operation is to be performed. The file name is formatted as an absolute path name.

For operation identifier 9, the operation specific information contains the AS/400 Control Language command which is to be executed at the user's request.

Length of Operation Specific Information
   INPUT; BINARY(4)
   Indicates the length (in bytes) of the operation specific information, or 0 if no operation specific information is provided.
Allow Operation
   OUTPUT; BINARY(4)
   Indicates whether the operation should be accepted or rejected. The possible values are:

| | |
|---|---|
| −1 | Always reject this operation identifier. For the remainder of the current session: any request with this operation identifier is treated as if it has been rejected by the exit program (including the current operation). The exit program is not called again with this operation identifier. |
| 0 | Reject the operation |
| 1 | Accept the operation |
| 2 | Always accept this operation identifier. |

For the remainder of the current session: any request with this operation identifier is treated as if it has been accepted by the exit program (including the current operation); the exit program is called again with this operation identifier.

Usage Notes

Table 2 defines the FTP client and server subcommands which are associated with each operation identifier. The various acronyms used in Table 2 have the following meanings:

| | |
|---|---|
| OPEN: | connect to FTP server on a remote system |
| LCD: | change working library or directory on local system |
| APPEND: | append a local file to a remote file |
| PUT: | copy a file from the local system to a file on a remote system |
| MPUT: | copy multiple files from the local system to files on a remote system |
| SYSCMD: | pass an AS/400 Control Language command to the local AS/400 system |
| MKD: | make (create) directory |
| XMKD: | make (create) directory |
| RMD: | remove (delete) directory |
| XRMD: | remove (delete) directory |
| CWD: | change working directory |
| CDUP: | change working directory to parent directory |
| XCWD: | change working directory |
| XCUP: | change working directory to parent directory |
| LIST: | obtain file list |
| NLST: | obtain file name list |
| DELE: | delete file |
| RETR: | retrieve file |
| APPE: | append to existing file |
| STOR: | store file |
| STOU: | store file with unique name |
| RNFR: | rename from |
| RNTO: | rename to |

-continued

| | |
|---|---|
| RCMD: | run AS/400 Control Language command on FTP server |
| ADDM: | add member to physical file |
| ADDV: | add variable-length member to physical file |
| CRTL: | create library |
| CRTP: | create physical file |
| CRTS: | create source physical file |
| DLTF: | delete file |
| DLTL: | delete library |

TCP/IP Application Server Logon Exit Program

Referring to Table 3, the TCP/IP application server logon exit program provides additional control over the process of authenticating a user to a TCP/IP application server. This exit program allows access to the server to be controlled by the address of the originating session, gives additional control over the initial current library to user (to allow the current library listed in the user profile to be overridden), and provides the capability to implement "anonymous" FTP (with the information required to log and control all such access). When installed, the exit program is called each time a user attempts to log on to the server. When the user exit program is given control, it verifies that the operation specified by the input parameters should be allowed to be performed. The setting of the return code output parameter determines whether or not the server will continue to process the logon operation. All character data passed to the exit program is in the CCSID of the job, or if the job CCSID is 65535, the default CCSID of the job. Any character data returned by the exit program is expected to be in this same CCSID.

Required Parameter Group
Application Identifier
  INPUT; BINARY(4)
  Identifies the application server from which the request is being made. The possible values are:

| | |
|---|---|
| 1 | FTP server program |

User Identifier
  INPUT; CHAR(*)
  The user identification supplied by the client program. For the FTP server, this parameter contains the data field from the USER subcommand.
Length of user Identifier
  INPUT; BINARY(4)
  The length (in bytes) of the user identifier string.
Authentication String
  INPUT; CHAR(*)
  The authentication string supplied by the client program. For the FTP server, this parameter contains the data field from the PASS (password) subcommand.
Length of Authentication String
  INPUT; BINARY(4)
  The length (in bytes) of the authentication string.
Client IP Address
  INPUT; CHAR(*)
  The Internet Protocol (IP) address from which the session originates. This string is in dotted decimal format, left justified.
Length of Client IP Address
  INPUT; BINARY(4)
  Indicates the length (in bytes) of the client IP address.
Return Code
  OUTPUT; BINARY(4)

Indicates whether the logon operation should be accepted or rejected, how password authentication should be performed, and if the initial current library should be overridden. The possible values are:

| | |
|---|---|
| 0 | Reject the logon operation. The user profile, password, and initial current library output parameters will be ignored. |
| 1 | Continue the logon operation with the specified user identifier and authentication string, and use the initial current library specified by the user profile. The user identifier will be used as the user profile, and the authentication string will be used as the password. The user profile, password, and initial current library output parameters will be ignored. The authentication string must match the password specified in the user profile for the logon to succeed. |
| 2 | Continue the logon operation with the specified user identifier and authentication string, and override the initial current library with that specified by the initial current library parameter. The user identifier will be used as the user profile, and the authentication string will be used as the password. The initial current library output parameter must be provided; the user profile and password output parameters will be ignored. The authentication string must match the password specified in the user profile for the logon to succeed. |
| 3 | Continue the logon operation, overriding the user profile and password with those returned in the output parameters of this exit program, and using the initial current library specified by the user profile that is returned by this exit program. The initial current library output parameter will be ignored. The password output parameter must match the password specified in the user profile for the logon to succeed. Passwords should not be coded directly in an exit program. This capability is provided to allow algorithmic password determination (via encryption, for example). |
| 4 | Continue the logon operation, overriding the user profile, password, and initial current library with those returned in the output parameters of this exit program. The password output parameter must match the password specified in the user profile for the logon to succeed. Passwords should never be coded directly in an exit program. This capability is provided to allow algorithmic password determination (via encryption, for example). |
| 5 | Accept the logon operation, overriding the user profile with that returned in the user profile output parameter of this exit program, and using the initial current library specified by the user profile that is returned by this exit program. The output parameters for initial current library and password will be ignored. If the system is running at a security level of 20 or higher, specifying this value will override normal AS/400 password processing. No further password authentication will be performed. |
| 6 | Accept the logon operation, overriding the user profile and initial current library with those returned in the output parameters of this exit program. The output parameter for password will be ignored. If the system is running at a security level of 20 or higher, specifying this value will override normal AS/400 password processing. No further password authentication will be performed. |

User Profile
  OUTPUT; CHAR(10)
  The user profile to use for this session. When required, this parameter must be left justified and space filled.
Password
  OUTPUT; CHAR(10)

The password to use for this session. When required, this parameter must be left justified and space filled.

Initial Current Library

OUTPUT; CHAR(10)

The initial current library to be established for this session. When required, this parameter must be left-justified and space filled.

ADVANTAGES OVER THE PRIOR ART

This invention provides the capability for a server logon exit program to deny or authorize a logon request based on any combination of a user authentication string and/or client network address; and a request validation exit program to deny or authorize an action request based on any combination of type of request, user, client network address and/or the specific data requested. Further, the invention does so without requiring any modification at the client side of the communication interface.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

TABLE 1

Anonymous FTP Application Request Validation Exit Program Parameter Group

Parameters
Required Paramter Group:

| | | | |
|---|---|---|---|
| 1. | Application identifier | Input | Binary(4) |
| 2. | Operation identifier | Input | Binary(4) |
| 3. | User profile | Input | Char(10) |
| 4. | Remote IP address | Input | Char(*) |
| 5. | Length of remote IP address | Input | Binary(4) |
| 6. | Operation specific information | Input | Char(*) |
| 7. | Length of operation specific information | Input | Binary(4) |
| 8. | Allow operation | Output | Binary(4) |

Exit Point Name: QIBM_QTMF_CLIENT_REQ
Exit Point Name: QIBM_QTMF_SERVER_REQ
Exit Point Format Name: VLRQ0100

TABLE 2

FTP Client and Server Subcommands

| Operation Identifier | Client Subcommands | Server Subcommands |
|---|---|---|
| 0 | OPEN | New connection (Note 1) |
| 1 | | MKD, XMKD |
| 2 | | RMD, XRMD |
| 3 | LCD | CWD, CDUP, XCWD, XCUP |
| 4 | | LIST, NLIST |
| 5 | | DELE |
| 6 | APPEND, PUT, MPUT (Note 2) | RETR |
| 7 | GET, MGET (Note 2) | APPE, STOR, STOU |
| 8 | | RNFR, RNTO |
| 9 | SYSCMD (Note 3) | RCMD, ADDM, ADDV, CRTL, CRTP, CRTS, DLTF, DLTL |

Note 1: The exit program is called with this operation identifier each time a connection request is received by the FTP server.
Note 2: For the MGET and MPUT subcommands, the exit program is called once for each file being sent or retrieved.
Note 3: If an exit program is installed for exit point QIBM_QTMF_CLIENT_REQ, the F21 (CL command line) key is disabled, and the user must use the SYSCMD subcommand to execute a CL command.

TABLE 3

Anonymous FTP Application Server Logon Exit Program Parameter Group

Parameters
Required Parameter Group:

| | | | |
|---|---|---|---|
| 1. | Application identifier | Input | Binary(4) |
| 2. | User identifier | Input | Char(*) |
| 3. | Length of user identifier | Input | Binary(4) |
| 4. | Authentication string | Input | Char(*) |
| 5. | Length of authentication string | Input | Binary(4) |
| 6. | Client IP address | Input | Char(*) |
| 7. | Lenth of client IP address | Input | Binary(4) |
| 8. | Return code | Output | Binary(4) |
| 9. | User profile | Output | Char(10) |
| 10. | Password | Output | Char(10) |
| 11. | Initial current library | Output | Char(10) |

Exit Point Name: QIBM_QTMF_SVR_LOGON
Exit Point Format Name: TCPL0100

We claim:

1. A method for operating a digital computer for building a server to enable and control FTP and anonymous FTP processing, comprising the steps of:

defining a server logon exit program interface including user identifier, authentication string, client IP address and return code parameters, said exit program being a program for controlling access to said server and to data residing on said server and a program which is callable by an existing computer application, using a defined interface, which is not part of said application;

defining a request validation exit program interface including an operation identifier, user name, client IP address, operation specific information, and return code parameters; and providing in a server program a data transformation routine, and routines for controlling server commands including commands for session initialization, directory creation, directory deletion, set current directory, list files, delete file, send file, receive file, rename file and execute operating system command.

2. The method of claim 1, further comprising:

building and installing a logon exit program and a request validation exit program for enforcing the security policies of a user enterprise with respect to the FTP server.

3. The method of claim 2, further comprising:

operating said server to establish a client session, including:

receiving a request for connection from a client;
calling said request validation exit to validate the request;

receiving a return code from said request validation exit program authorizing or rejecting the connection request;

responsive to the return code, if not authorized, rejecting the connection; otherwise:

activating the connection to the client;

receiving a user subcommand containing the user name;

responsive to a user name of anonymous, requesting an electronic mail address from said user; and thereafter receiving a command from said user containing the electronic mail address as an authentication string;

responsive to a user name other than anonymous, requesting a password from said user, and thereafter receiving a command from said user containing the password as an authentication string;

calling the server logon exit program, including user name and authentication string and the client network address;

receiving a return code from said server logon exit program;

responsive to a reject return code, rejecting the logon request;

responsive to an unconditional accept return code, accepting the logon request without further authentication; and responsive to a conditional accept return code, validating the authentication string as a logon password.

4. The method of claim 3, further comprising:

operating said server to process requests from the client session, including receiving an action request to perform an action on the server system;

calling said request validation exit to validate the action request;

receiving a return code from said request validation exit program authorizing or rejecting the action request;

responsive to the return code, if not authorized, rejecting the action request; otherwise processing said action request;

whereby said server logon exit program denies or authorizes said logon request based on any combination of user authentication string and client network address; and said request validation exit program denies or authorizes said action request based on any combination of type of request, user, client network address, and specific data requested.

5. A method for operating a digital computer to enable and control FTP and anonymous FTP processing on a digital computer, comprising the steps of:

building a server, including:

defining a server logon exit program interface including user identifier, authentication string, client IP address and return code parameters;

defining a request validation exit program interface including an operation identifier, user name, client IP address, operation specific information, and return code parameters;

providing in a server program a data transformation routine, and routines for controlling server commands such as commands for session initialization, directory creation, directory deletion, set current directory, list files, delete file, send file, receive file, rename file and execute operating system command;

building and installing a logon exit program and a request validation exit program for enforcing the security policies of a user enterprise with respect to the FTP server;

operating said server to establish a client session, including:

receiving a request for connection from a client;

calling said request validation exit to validate the request;

receiving a return code from said request validation exit program authorizing or rejecting the connection request;

responsive to the return code, if not authorized, rejecting the connection; otherwise:

activating the connection to the client;

receiving a user subcommand containing the user name;

responsive to a user name of anonymous, requesting an e-mail address from said user; and thereafter receiving a PASS subcommand from said user containing the e-mail address as an authentication string;

responsive to a user name other than anonymous, requesting a password from said user, and thereafter receiving a command from said user containing the password as an authentication string;

calling the server logon exit program, including user name and authentication string and the client network address);

receiving a return code from said server logon exit program;

responsive to a reject return code, rejecting the logon request;

responsive to an unconditional accept return code, accepting the logon request without further authentication; and responsive to a conditional accept return code, validating the authentication string as a logon password;

operating said server to process requests from the client session, including receiving an action request to perform an action on the server system;

calling said request validation exit to validate the action request;

receiving a return code from said request validation exit program authorizing or rejecting the action request;

responsive to the return code, if not authorized, rejecting the action request; otherwise processing said action request;

whereby said server logon exit program denies or authorizes said logon request based on any combination of user authentication string and client network address; and said request validation exit program denies or authorizes said action request based on any combination of type of request, user, client network address, and specific data requested.

6. A method for operating a digital computer for building a server to enable and control FTP and anonymous FTP processing, comprising the steps of:

defining a server logon exit program interface including user identifier, authentication string, client IP address and return code parameters;

defining a request validation exit program interface including an operation identifier, user name, client IP address, operation specific information, and return code parameters;

providing in a server program a data transformation routine, and routines for controlling server commands including commands for session initialization, directory creation, directory deletion, set current directory, list files, delete file, send file, receive file, rename file and execute operating system command;

building and installing a logon exit program and a request validation exit program for enforcing the security policies of a user enterprise with respect to the FTP server;

operating said server to establish a client session, including:

receiving a request for connection from a client;

calling said request validation exit to validate the request;

receiving a return code from said request validation exit program authorizing or rejecting the connection request;

responsive to the return code, if not authorized, rejecting the connection; otherwise:

activating the connection to the client;

receiving a user subcommand containing the user name;

responsive to a user name of anonymous, requesting an electronic mail address from said user; and thereafter receiving a command from said user containing the electronic mail address as an authentication string;

responsive to a user name other than anonymous, requesting a password from said user, and thereafter receiving a command from said user containing the password as an authentication string;

calling the server logon exit program, including user name and authentication string and the client network address;

receiving a return code from said server logon exit program;

responsive to a reject return code, rejecting the logon request;

responsive to an unconditional accept return code, accepting the logon request without further authentication; and responsive to a conditional accept return code, validating the authentication string as a logon password.

7. The method of claim 6, further comprising:

operating said server to process requests from the client session, including receiving an action request to perform an action on the server system;

calling said request validation exit to validate the action request;

receiving a return code from said request validation exit program authorizing or rejecting the action request;

responsive to the return code, if not authorized, rejecting the action request; otherwise processing said action request;

whereby said server logon exit program denies or authorizes said logon request based on any combination of user authentication string and client network address; and said request validation exit program denies or authorizes said action request based on any combination of type of request, user, client network address, and specific data requested.

* * * * *